(12) United States Patent
Seno

(10) Patent No.: US 6,204,625 B1
(45) Date of Patent: Mar. 20, 2001

(54) DRIVING APPARATUS FOR STEPPING MOTOR

(75) Inventor: Masakazu Seno, Tottori (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/384,617

(22) Filed: Aug. 27, 1999

(30) Foreign Application Priority Data

Aug. 28, 1998 (JP) .................................................. 10-243119

(51) Int. Cl.⁷ .................................. H02P 5/41; H02P 8/00
(52) U.S. Cl. .......................... 318/685; 318/138; 318/254; 318/689
(58) Field of Search ..................................... 318/138, 245, 318/254, 685, 689, 696, 632, 721, 722, 723

(56) References Cited

U.S. PATENT DOCUMENTS

| | | | |
|---|---|---|---|
| 4,223,261 | * 9/1980 | White | 318/721 |
| 4,710,691 | * 12/1987 | Bergstrom et al. | 318/696 |
| 4,746,843 | * 5/1988 | Taenzer | 318/138 |
| 5,602,681 | * 2/1997 | Nakayama et al. | 359/698 |

FOREIGN PATENT DOCUMENTS

| | | |
|---|---|---|
| 58-90614 | * 5/1983 | (JP) . |
| 6-343294 | 12/1994 | (JP) . |
| 9-219988 | * 8/1997 | (JP) . |
| 10-174497 | * 6/1998 | (JP) . |

* cited by examiner

Primary Examiner—Paul Ip
(74) Attorney, Agent, or Firm—Ratner & Prestia

(57) ABSTRACT

A driving apparatus equipped with a step controlling circuit drives stepping motors in a micro stepping manner. An encoder which detects a mover position of the motor supplies a signal to the controlling circuit, thereby halting the micro-step-driving. This structure eliminates the influence by detent torque, and allows the apparatus to control a motor positioning in an accurate manner.

5 Claims, 2 Drawing Sheets

DRIVING APPARATUS FOR STEPPING MOTOR

FIELD OF THE INVENTION

The present invention relates to a driving apparatus for stepping motors which are employed in office automation devices, information equipment and the like. More particularly, it relates to a driving apparatus which can provide stepping motors with accurate positioning control.

BACKGROUND OF THE INVENTION

A conventional driving apparatus of stepping motors is disclosed in the Japanese Patent Application non-examined publication No. H06-343294. FIG. 4 shows a block diagram of the conventional driving apparatus.

In FIG. 4, driving circuit 302 magnetizes sequentially the coils of two-phase stator of stepping motor 301, thereby driving motor 301 in a stepping manner. Up-down counter 351 counts an instruction signal, i.e. a stepping signal, which drives motor 301 in a stepping manner. Read-only-memories (ROM) 352 and 353 receive the count values by counter 351, and output prerecorded magnetizing-signal-data responsive to the counted value. Digital to analog converters (D/A converters) 354 and 355 receive the digital magnetizing signal data from ROMs 352 and 353, convert the data into analog voltage data, and finally output the analog data into driving circuit 302. Driving circuit 302 receives voltage signals from D/A converters 354 and 355, amplifies the voltage signal, and applies the resultant voltage to motor 301, whereby motor 301 can be driven as described above.

In the structure discussed above, the data stored in ROMs 352 and 53 are set to draw a pseudo-sine-wave so that a number of steps required rotating the motor one turn increases, thereby narrowing a step angle per step. As a result, the motor rotates smoothly.

However, in the conventional structure discussed above, irregular torque such as detent torque affects the operation whereby accurate positioning control of the motor cannot be expected. The motor produces toque in order to maintain the original position against outside torque that tries to rotate the rotor without magnetizing the stator coils. The maximum value of this torque is called detent torque.

When an encoder is coupled to motor 301 so that rotating information of motor 301 is fed back to a control circuit, i.e. closed-loop-positioning-control is provided, an accurate positioning can be realized; however, it requires a complicated circuit.

SUMMARY OF THE INVENTION

The present invention addresses the problem discussed above, and aims to provide a driving apparatus of stepping motors with the same accuracy inherent in an encoder, lower noise as well as less vibrations, and a simple circuit structure.

The driving apparatus of stepping motors of the present invention comprises the following elements:

a stepping motor, an encoder, a control circuit and a driving circuit.

The encoder detects the mover position of a stepping motor. The control circuit outputs a pseudo-sine-wave-signal to be synchronized with a clock signal, when an instruction pulse signal is provided. The pseudo-sine-wave-signal is used for driving the stepping motor in a micro step manner. The control circuit halts outputting the pseudo-sine-wave-signal, when a mover-position-signal is provided from the encoder.

The driving circuit amplifies the pseudo-sine-wave-signal to drive the stepping motor.

The construction discussed above allows the driving apparatus to control the spin of motor at the same accuracy inherent in the encoder, whereby positioning accuracy by micro-step driving can be increased and positional displacement due to the irregular torque can be eliminated. As a result, smooth driving is achieved, and noises as well as vibrations can be reduced.

DETAILED DESCRIPTION OF THE INVENTION

An exemplary embodiment of the present invention is described hereinafter with reference to the accompanying drawings.

Figure 1:
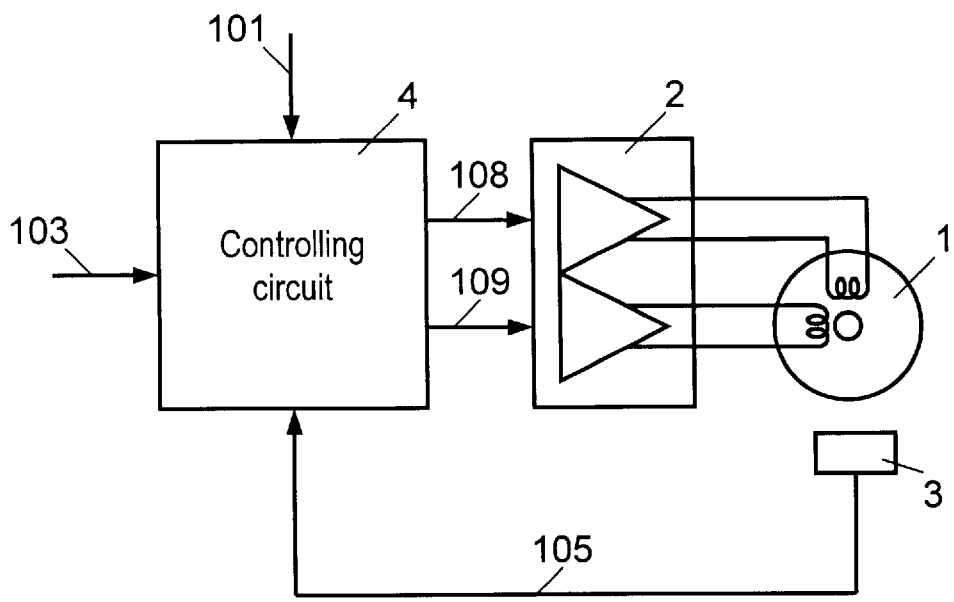
FIG. 1 is a block diagram illustrating a driving apparatus of stepping motors in accordance with an exemplary embodiment of the present invention.

FIG. 1 is a block diagram illustrating a driving apparatus of stepping motors in accordance with the exemplary embodiment of the present invention.

In FIG. 1, driving circuit 2 sequentially magnetizes the coils of two-phase stator of stepping motor 1, whereby a rotor (not shown), i.e. a mover, of motor 1 is driven in a stepping manner.

Step-controlling-circuit 4 receives clock signal 101, instruction pulse signal 103 and encoder signal 105, and then outputs driving signals 108 and 109 into driving circuit 2.

Clock signal 101 is produced in reference to a highly accurate frequency such as an oscillating frequency produced by a crystal oscillator. Instruction pulse signal 103 drives motor 1 in a stepping manner. Encoder signal 105 is a detecting signal supplied from encoder 3 to detect the rotor rotating position of motor 1.

Driving signals 108 and 109 form pseudo-sine-wave for driving motor 1 in a micro stepping manner with a cycle of clock signal 101, when instruction pulse signal 103 is fed into controlling circuit 4. When controlling circuit 4 receives encoder signal 105, driving signals 108 and 109 are halted.

How to control the motor with the driving apparatus is described hereinafter.

When receiving instruction-pulse-signal 103, controlling circuit 4 outputs driving signals 108 and 109 forming pseudo-sine-wave into driving circuit 2. Driving signals 108 and 109 drive motor 1 in a micro stepping manner, and are output by synchronizing with clock signal 101. Driving circuit 2 amplifies driving signals 108 and 109 and supplies them to motor 1. Encoder 3 detects a rotating position of the rotor of motor 1, and then outputs the detection result as encoder signal 105 to controlling circuit 4. Controlling circuit 4 receives encoder signal 105, then halts supplying driving signals 108 and 109 in pseudo-sine-waveform into driving circuit 2.

A structure and an operation of controlling circuit 4 is described hereinafter with reference to FIG. 2 and FIG. 3.

Figure 2:
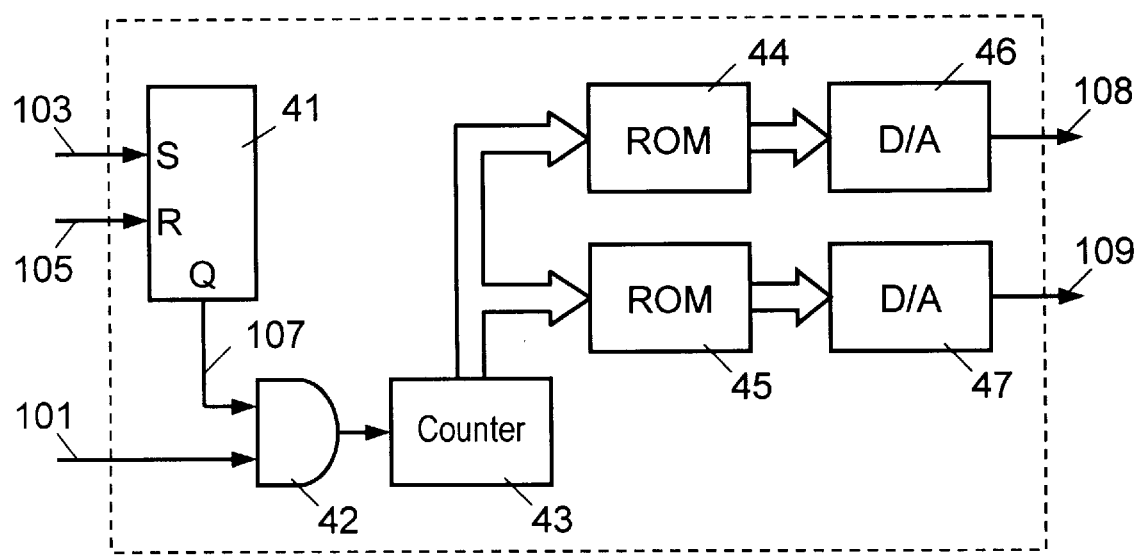
FIG. 2 is a block diagram illustrating a step-controlling-circuit in the same apparatus shown in FIG. 1.
Figure 3:
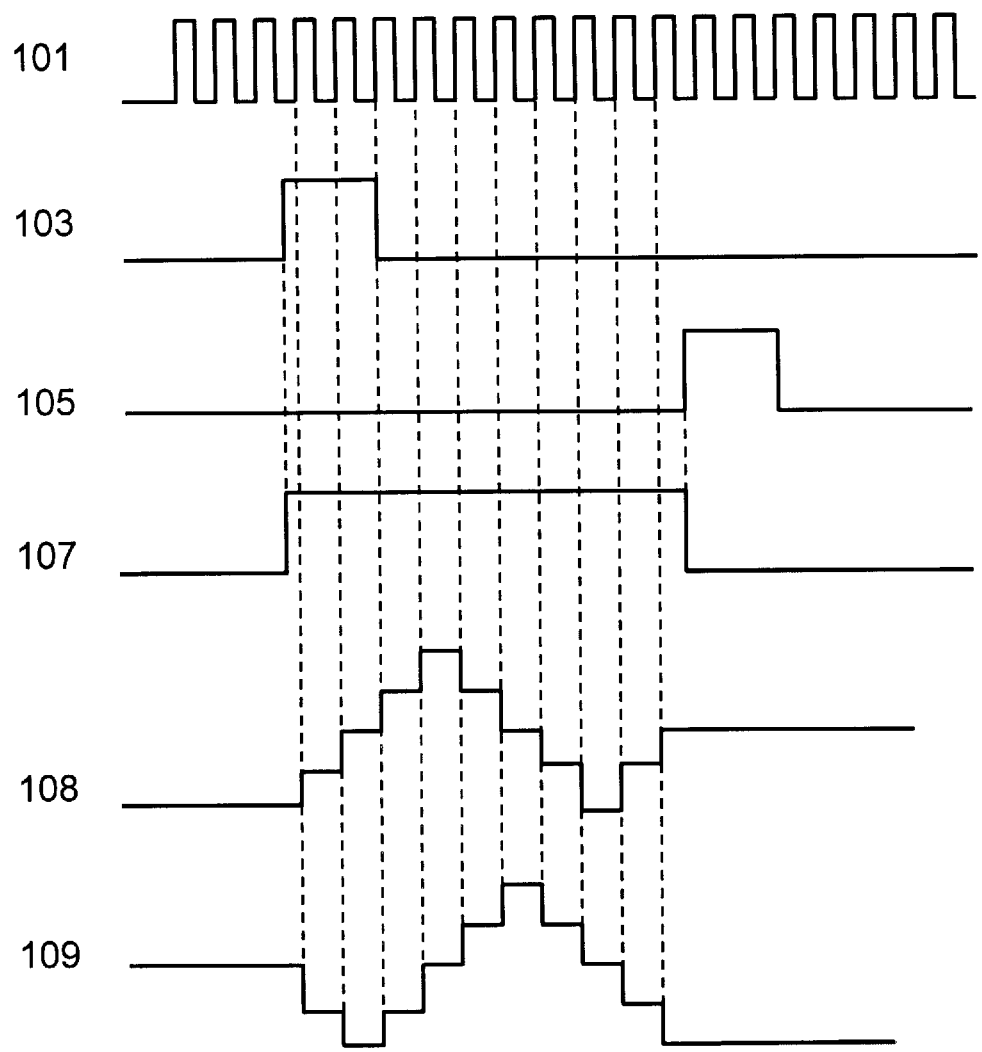
FIG. 3 is a timing chart illustrating an operation of the same apparatus shown in FIG. 1.
Figure 4:
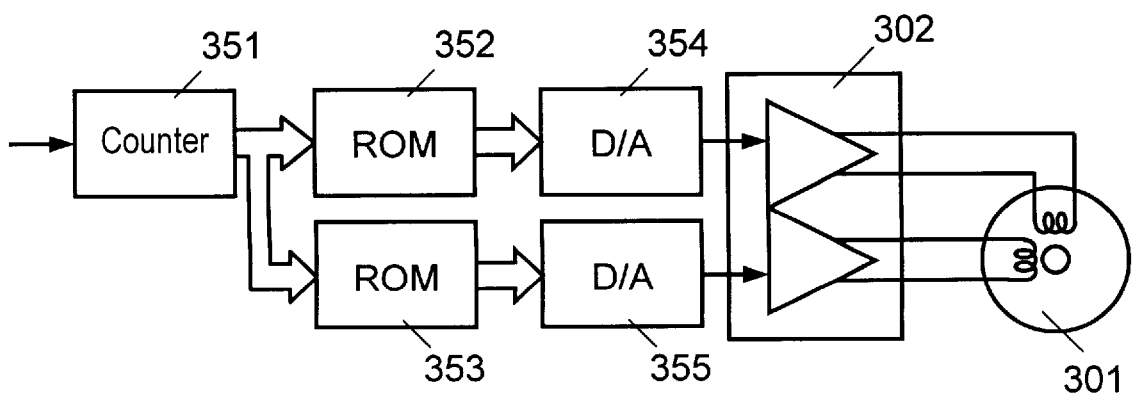
FIG. 4 is a block diagram illustrating a driving apparatus of stepping motors disclosed in prior art.

FIG. 2 is a block diagram illustrating the step-controlling-circuit in the driving apparatus, and FIG. 3 is a timing chart illustrating an operation of the same apparatus.

In FIG. 2, SR (set-reset) latch circuit 41 is set by instruction-pulse-signal 103 and is reset by encoder signal 105. AND circuit 42 calculates AND of output signal 107 supplied from SR latch circuit 41 and clock signal 101, and outputs the AND to counter 43.

ROMs 44 and 45 receive a count value of counter 43, and output digital data corresponding to the count value into D/A converters 46 and 47 respectively. D/A converters 46 and 47 convert the digital data into analog form, i.e. pseudo-sine-wave-signals 108 and 109, and output them to driving circuit 2. Signals 108 and 109 discussed above form, e.g. the steps formed by signals 108 and 109 shown in FIG. 3, and the steps look like a sine wave.

The timing chart shown in FIG. 3 is further detailed.

When receiving a leading edge from low (L) to high (H) of instruction pulse signal 103, SR latch circuit 41 holds its output Q at H level. At this moment, a first input to AND circuit 42, i.e. signal 107, is kept at H level, thus a second input, i.e. clock signal 101, passes through AND circuit 42 as it is and is tapped off from circuit 42. Counter 43 counts a number of the leading edges of clock signals 101 supplied from AND circuit 42.

ROM 44 outputs digital data corresponding to the count values supplied from counter 43 to D/A converter 46, which converts the digital data into an analog form, i.e. pseudo-sine-wave-signal 108.

Signal 108 is formed through the following process: When receiving a leading edge of clock signal 101, counter 43 counts up its count value by a given value, and repeats this count-up until it receives the fourth leading edge. When it receives the fifth leading edge, counter 43 counts down its value by the same given value, and repeats this count-down until it receives the eighth leading edge. Thus the eight pulses of clock signal 101 form one cycle of pseudo-sinewave-signal (an electric angle=360°).

In the same manner, ROM 45 outputs digital data corresponding to count values supplied from counter 43 to D/A converter 47, which converts the digital data into an analog form, i.e. pseudo-sine-wave-signal 109.

The digital data stored in ROM 45 differs from that stored in ROM 44 in the following points: ROMs 45 and 44 store respective signals so that signal 109 delays from signal 108 by two pulses of clock signal 101, i.e. 90° phase of electrical angle.

When receiving a leading edge of encoder signal 105, SR latch circuit 41 is reset, and its output Q is inverted into L level. At this moment, since the first input, i.e. signal 107, fed to AND circuit 42 is at L level, AND circuit 42 outputs L regardless of the second input, i.e. clock signal 101. Counter 43 halts counting because it receives signals always at L level from AND circuit 42. This results in the digital data supplied from ROMs 44 and 45 being fixed (stop changing) as well as signals 108 and 109 being fixed at the present voltage values. As such, when SR latch circuit 41 receives encoder signal 105, D/A converters 46 and 47 halt outputting signals 108 and 109.

As the embodiment describes, step-controlling-circuit 4 outputs pseudo-sine-wave-signals 108 and 109 to driving circuit 2 in response to instruction-pulse-signal 103. These two signals are in two phases with a phase-difference of 90° and supplied synchronizing clock-signal 101. Controlling circuit 4 halts supplying pseudo-sine-wave-signals 108 and 109 in response to encoder signal 105.

Pseudo-sine-wave-signals 108 and 109 for driving motor 1 are thus formed with reference to clock signal 101, which is produced by dividing the oscillating frequency of a stable oscillator with extreme accuracy, such as a crystal oscillator. Signals 108 and 109 are thus extremely accurate and stable.

Motor 1 stops responsive to encoder signal 105, therefore, encoder 3 with higher accuracy would allows motor 1 to control the positioning more accurately. Rotating speed of the motor can be changed by changing the frequency of instruction pulse signal 103. For instance, the rotating speed increases at greater frequency of instruction pulse signal 103.

The structure discussed above allows the driving apparatus of the present invention to drive motor 1 in a micro stepping manner with pseudo-sine-wave-signal when controlling circuit 4 receives pulse-instruction-signal 103, and to stop motor 1 at the rotating position detected by encoder 3. In other words, the driving apparatus can control motor 1 at the same accuracy inherent in the encoder. As a result, the driving apparatus does not invite irregular torque such as detent torque, and improves positioning accuracy during the micro stepping drive, thereby driving the motor with lower noises and less vibrations.

In this embodiment, eight pulses of clock signal 101 corresponds to one cycle of pseudo-sine-wave-signals 108 and 109; however, it is not limited to eight pulses. Signals 108 and 109 have been directly fed into driving circuit 2 for amplification; however, these signals can be fed into a smoothing filter to be further smoothed before the driving circuit 2.

The driving signals that magnetize respective stator coils do not necessarily draw the pseudo-sine-wave as described in this embodiment. The waveform of the driving signal can be just formed by synchronizing the clock signal, and as far as it can drive the stepping motor in a micro stepping manner, the driving signal functions properly.

In this embodiment, the two-phase stator coils are used; however, the driving apparatus of the present invention can drive other types of stepping motor with the same result. The driving apparatus also can drive not only the stepping motor employing a rotary type mover, but also the stepping motor with a linear type mover.

In this embodiment, step-controlling-circuit 4 and driving circuit 2 are described as discrete circuits; however, these and other circuits can be integrated into an IC.

What is claimed is:

1. An apparatus for driving a stepping motor, said apparatus comprising:
   a stepping motor;
   an encoder for detecting a position of a mover of said motor;
   a controller for outputting a pseudo-sine-wave-signal with synchronizing a clock signal in response to receiving an instruction-pulse-signal, the pseudo-sine-wave-signal being used for driving said stepping motor in a micro step manner, and for halting the pseudo-sine-wave-signal in response to receiving a detection signal supplied from said encoder; and a driver for amplifying the pseudo-sine-wave-signal to drive said stepping motor.

2. An apparatus for driving a stepping motor of claim 1 wherein the mover is a rotor.

3. An apparatus for driving a stepping motor, said apparatus comprising:

a stepping motor including a mover and a stator wound with a stator coil;

an encoder for detecting a position of the mover;

a controller for outputting a driving signal with synchronizing a clock signal in response to receiving an instruction-pulse-signal, the driving signal being used for driving said stepping motor, and for halting the driving signal in response to receiving a detection signal supplied from said encoder; and a driver for amplifying the driving signal to magnetize the stator coil.

4. The apparatus for driving a stepping motor of claim 3 wherein said stepping motor comprises stator coils having a plurality of phases; and wherein the driving signals for magnetizing the respective stator coils have predetermined phase differences with one another.

5. The apparatus for driving a stepping motor of claim 4 wherein the driving signals are pseudo-sine-wave-signals.

* * * * *

UNITED STATES PATENT AND TRADEMARK OFFICE
CERTIFICATE OF CORRECTION

PATENT NO.    : 6,204,625 B1
DATED         : March 20, 2001
INVENTOR(S)   : Masakazu Seno It is certified that error appears in the above-identified patent and that said Letters Patent is hereby corrected as shown below:

Column 4,
Lines 61-62,
"a controller for outputting a pseudo-sine-wave-signal with synchronizing a clock signal in response to receiving an"
should read as
-- a controller for outputting a pseudo-sine-wave-signal synchronized with a clock signal in response to receiving an --.

Column 5,
Lines 10-11,
"a controller for outputting a driving signal with synchronizing a clock signal in response to receiving an"
should read as
-- a controller for outputting a driving signal synchronized with a clock signal in response to receiving an --.

Signed and Sealed this

Nineteenth Day of November, 2002

Attest:

Attesting Officer

JAMES E. ROGAN
*Director of the United States Patent and Trademark Office*